United States Patent [19]

Koganemaru

[11] 4,024,847
[45] May 24, 1977

[54] DIGITAL CONTROL DEVICE FOR RECIRCULATED FLOW OF EXHAUST GAS IN AN INTERNAL COMBUSTION ENGINE

[75] Inventor: Shunji Koganemaru, Susono, Japan

[73] Assignee: Toyota Jidosha Kogyo Kabushiki Kaisha, Japan

[22] Filed: Mar. 1, 1976

[21] Appl. No.: 662,875

[30] Foreign Application Priority Data

Nov. 25, 1975 Japan .............................. 50-140897

[52] U.S. Cl. .......................................... 123/119 A
[51] Int. Cl.² ........................................ F02M 25/06
[58] Field of Search ......... 123/119 A; 60/278, 279, 60/272

[56] References Cited

UNITED STATES PATENTS

| | | | |
|---|---|---|---|
| 3,799,133 | 3/1974 | Frank | 123/119 A |
| 3,807,376 | 4/1974 | Glockler | 123/119 A |
| 3,888,222 | 6/1975 | Tomita | 123/119 A |
| 3,915,035 | 10/1975 | Chana | 123/119 A |
| 3,941,105 | 3/1976 | Yagi | 123/119 A |
| 3,963,011 | 6/1976 | Saito | 123/119 A |

Primary Examiner—Wendell E. Burns
Attorney, Agent, or Firm—Oblon, Fisher, Spivak, McClelland & Maier

[57] ABSTRACT

An arrangement for exhaust gas purification is such that a plurality of valve openings communicate the suction or intake tube within the cylinder with a recirculation pipe for recirculating the exhaust gas into the suction tube, and each valve opening is controlled to open or close by means of a valve which is regulated in response to various signals derived from the internal combustion engine and emitted as signals from a computer so as to thereby adjust the flow rate of the exhaust gas being recirculated and to purify the same.

9 Claims, 4 Drawing Figures

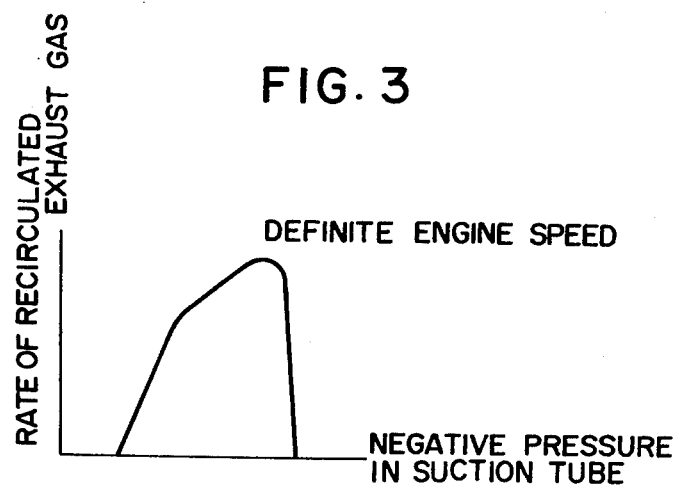
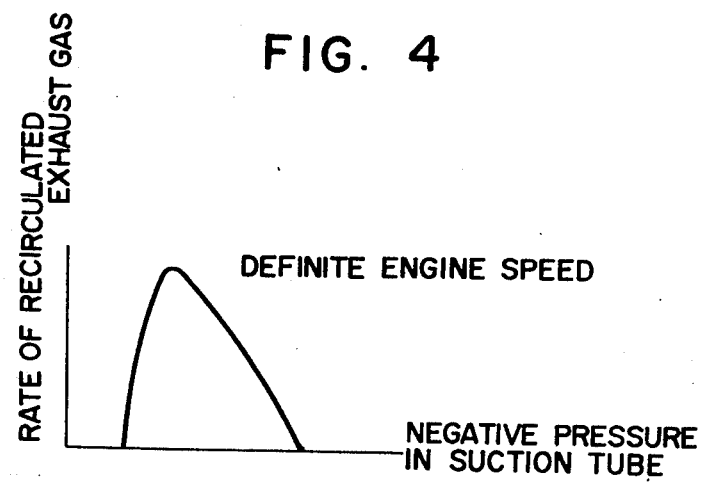

DIGITAL CONTROL DEVICE FOR RECIRCULATED FLOW OF EXHAUST GAS IN AN INTERNAL COMBUSTION ENGINE

BACKGROUND OF THE INVENTION

1. Field of the Invention:

The present invention relates generally to a flow rate control device for recirculating the exhaust gas to be purified within an internal combustion engine, and more specifically to a digital control device for controlling the flow rate of the recirculated exhaust gas.

2. Description of the Prior Art:

Device for recirculating a portion of the exhaust gas from an internal combustion engine and for purifying the same have of course been in wide-spread use fo some time. Apparatus equipped with a valve, controllable to open or close in response to the negative pressure within the suction or intake tube, is typical of such devices, within this device, the specified valve-opening characteristic cannot be altered as the occasion requires.

SUMMARY OF THE INVENTION

Accordingly, it is an object of the present invention to eliminate the aforenoted inconvenience and to provide a device which can digitally control the flow rate of the recirculated exhaust gas.

Another object of the present invention is to provide a device which, in response to a digital signal, adjusts the open area of the recirculation path for the exhaust gas, the digital signal being controlled by means of input signals characteristic of various conditions of the engine.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 3 is a graphical diagram illustrating the rate of gas suction within the conventional exhaust gas recirculation device; and FIG. 4 is a graphical diagram of the rate of gas suction within the exhaust gas recirculation device constructed according to the present invention.

DETAILED DESCRIPTION OF A PREFERRED EMBODIMENT

Figure 1:
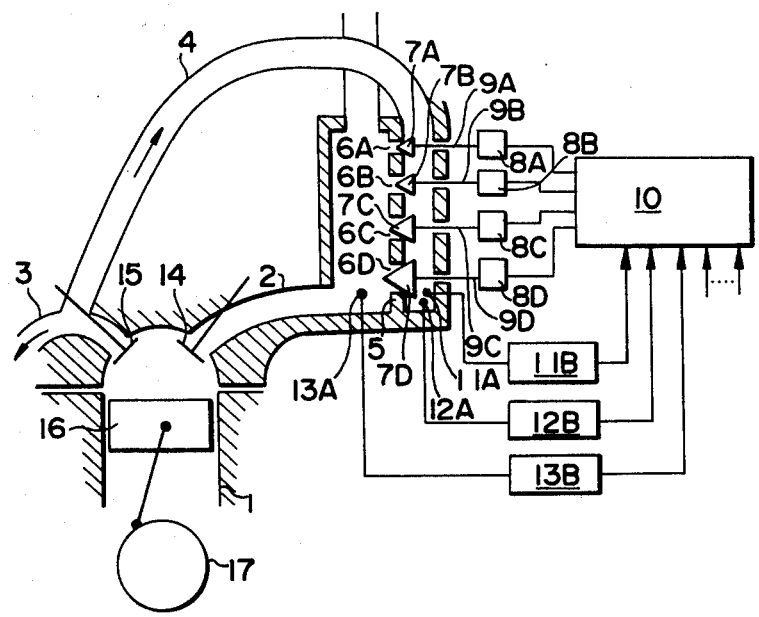
FIG. 1 is a schematic diagram illustrating one embodiment of the present invention, showing its cooperative parts.

Referring now to the drawings, and more particularly to FIG. 1 thereof, a preferred embodiment of the present invention will now be described. Within a cylinder 1 of an internal combustion engine, a recirculation pipe 4, for introducing exhaust gases into a suction or intake tube 2, is interposed between the suction tube 2 disposed downstream of the carburetor, not shown, and an exhaust tube or conduit 3, the recirculation pipe 4 and suction tube 2 adjoining one another over a specified partial extent thereof. Within a partition wall 5 which separates pipe 4 and tube 2, there is provided a plurality of valve openings 6A, 6B, 6C, and 6D each of which is respectively controlled by means of a valve 7A, 7B, 7C, and 7D which are respectively operatively connected to a series of plungers 9A, 9B, 9C, and 9D respectively controlled by means of solenoids 8A, 8B, 8C, and 8D.

Within the illustrated embodiment, the open area ratios of the valve openings 6A, 6B, 6C, and 6D are respectively set at $2^0$, $2^1$, $2^2$, $2^3$, and thus, if there are n bits, according to the binary system, under the decimal system the open areas will be set for values of $0 \rightarrow 2^n - 1$. In this case therefore, as the setting has only to be made for n = 4, the open areas for securing a certain flow rate of recirculated exhaust gas are provided in 0 – 15 units and exact control for each unit is obtained as desired, or in other words, exact control for each one of the 0 – 15 units will be made by means of a full-open or full-closed control of the four valve openings 6A – 6D. Accordingly, if the open areas of the four valve openings are set, such that one unit corresponds to valve opening 6A, two units for valve opening 6B, four units for valve opening 6C, and eight units for valve opening 6D, a particularly selected open area will be obtained through means of the following combinations:

| 6D | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| 6C | 0 | 0 | 0 | 0 | 1 | 1 | 1 | 1 | 0 | 0 | 0 | 0 | 1 | 1 | 1 | 1 |
| 6B | 0 | 0 | 1 | 1 | 0 | 0 | 1 | 1 | 0 | 0 | 1 | 1 | 0 | 0 | 1 | 1 |
| 6A | 0 | 1 | 0 | 1 | 0 | 1 | 0 | 1 | 0 | 1 | 0 | 1 | 0 | 1 | 0 | 1 |
| Open area | 0 | 1 | 2 | 3 | 4 | 5 | 6 | 7 | 8 | 9 | 10 | 11 | 12 | 13 | 14 | 15 |

Within the above table, 0 designates a full-closed condition, and 1 designates a full-open condition, and the open close control for each valve opening depends upon operation of a digital computer 10. The key factors determining the opening or closing of each valve and operatively associated therewith comprise the following signals: a temperature signal obtained by sensing the temperature within the recirculation pipe 4 by means of a temperature detector 11A and conveying the sensed result through a temperature coverter 11B; a pressure signal obtained by sensing the pressure within the recirculation pipe 4 by means of a pressure detector 12A and conveying the sensed result through a pressure convertor 12B; or a pressure signal obtained by sensing the pressure within the suction tube 2 by means of a pressure detector 13A and conveying the sensed result through a pressure convertor 13B. In addition, the vehicle speed, the transmission position, the engine speed, the cooling water temperature, the atmospheric condition, and the engine running conditions are also available as input signals singly, or in combination with the signals noted hereinabove.

Within the figure, the engine intake and exhaust valves are respectively designated at 14 and 15, 16 is the piston, and 17 is the crankshaft. The flow rate of the recirculated exhaust gas can be estimated from the sum of the open areas of the valves 7A – 7D and the pressure difference before and after the valve openings 6A – 6D, or alternatively, the temperature difference before and after the valve openings 6A – 6D, and such flow rate of recirculated exhaust gas within a given operative state of the running engine, may be determined by the volume of sucked air or other similar conditions.

Figure 2:
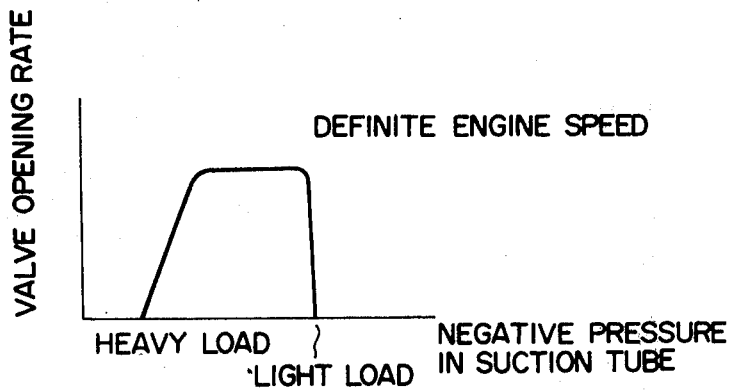
FIG. 2 is a graphical diagram of the valve-opening operation characteristic of a conventional exhaust gas recirculation device.

Within a typical case of the conventional exhaust gas recirculation device equipped with a valve controllable for opening and closing by means of the negative pressure within the suction tube, the valve-opening characteristics are illustrated within FIG. 2, and the exhaust gas is recirculated as illustrated within FIG. 3 at such a rate that a large volume of the gas flows into the cylinder under light load, unavoidably causing a serious drop in the operative performance, while under heavy load, the volume of recirculated gas cannot be sufficiently increased. On the contrary, within the device constructed according to the present invention, as illustrated within FIG. 4, the flow rate of recirculated exhaust gas can be decreased under light load, while it can be increased under heavy load, thereby improving the flow characteristics, and moreover, this characteristic can be freely set as required.

According to the present invention, then, not only an integral number of open area units for the valve openings, but also a fractional number thereof, can be easily set, and furthermore, accuracy to 0.5 unit can be easily attained by adding a single valve. In accordance with the present invention, the device can thus be extremely simplified, because the control can be easily accomplished by means of a digital computer and a digital-/analog converter is rendered unnecessary.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A digital control device for controlling the flow rate of recirculated exhaust gas within an internal combustion engine comprising:
   a cylinder;
   a suction tube and an exhaust tube connected to said cylinder;
   a recirculation pipe interposed between said suction tube and said exhaust tube;
   a plurality of valve openings provided within a partition wall which separates said recirculation pipe and said suction tube which partially adjoin each other over a specified extent thereof; pl valve means for opening and closing said valve openings; and
   a digital computer, for opening and closing specific valves in response to various signals generated from said internal combustion engine, connected to said valves.

2. A digital control device as set forth in Claim 1, wherein:
   said recirculation pipe and said suction tube are partially separated by said partition wall; and
   said valve openings are provided within said partition wall.

3. A digital control device as set forth in claim 1, wherein:
   said valve openings within said partition wall have different open areas.

4. A digital control device as set forth in claim 1, wherein:
   the open area ratios of said valve opeings of said partition wall are respectively set at $2^0, 2^1, 2^2 \ldots$.

5. A digital control device as set in claim 1, wherein:
   temperature detector means for generating an open/close signal for each of said valve means and for supplying said signals to said computer is installed within said recirculated pipe.

6. A digital control device as set forth in claim 1, wherein:
   pressure detector means for generating an open/close signal for each valve means and for supplying said signals to said compiter is installed within said recirculation pipe.

7. A digital control device as set forth in claim 1, wherein:
   pressure detector means for generating an open/close signal for each of said valve means and for supplying said signals to said computer is installed within said suction tube.

8. A digital control device as set forth in claim 1, wherein:
   the car speed, the transmission position, the engine revolutions, the cooling water temperature, the atmospheric condition, and the engine running condition are utilized singly or in combinaton as said various valve control signals.

9. A digital control device as set forth in claim 1, wherein:
   each valve means is operated by means of a solenoid plunger which is controlled by means of said digital computer.

* * * * *